United States Patent Office 3,471,787

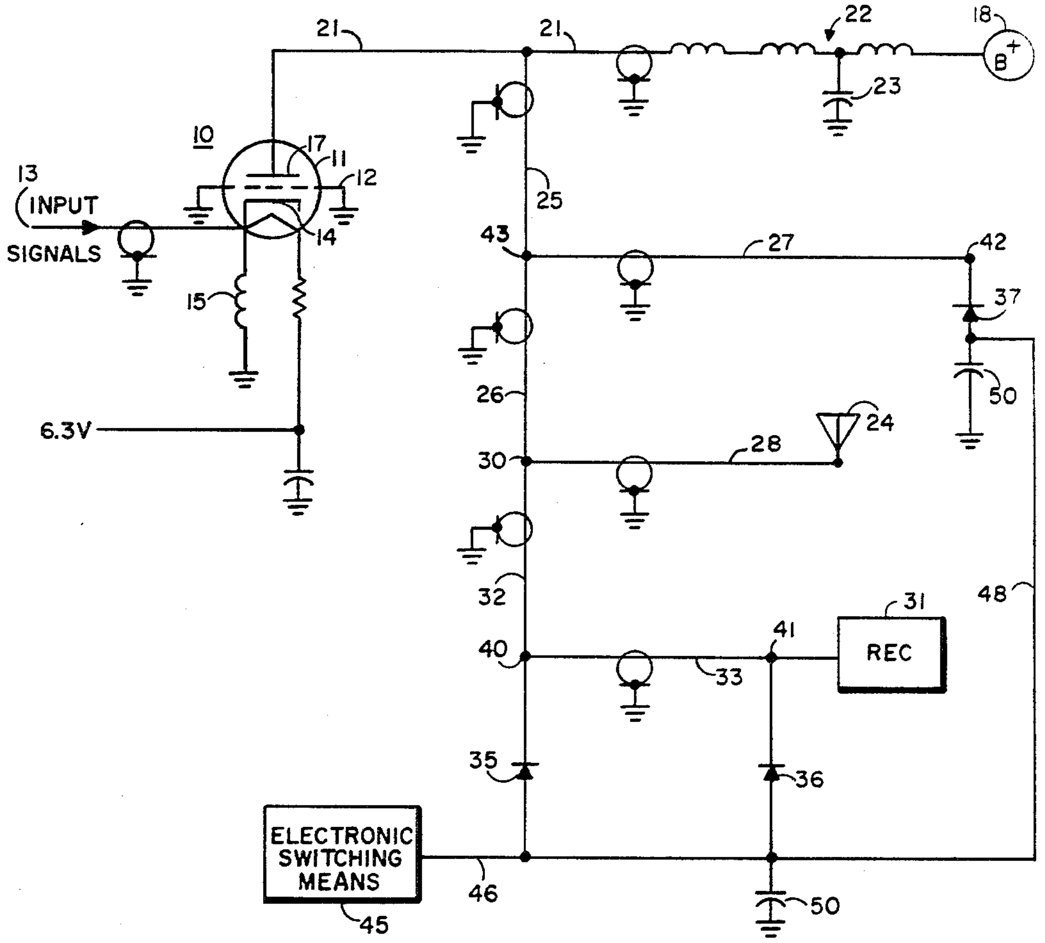
INVENTOR.
ROBERT F. MORRISON, JR.
BY Raymond L Owens
ATTORNEY

Patented Oct. 7, 1969

3,471,787

DUPLEXING SYSTEM

Robert F. Morrison, Jr., Rochester, N.Y., assignor to General Dynamics Corporation, a corporation of Delaware Filed May 6, 1966, Ser. No. 548,191
Int. Cl. H04b 1/40, 1/44
U.S. Cl. 325—22 1 Claim

ABSTRACT OF THE DISCLOSURE

A duplexing system for protecting a receiver which shares the same antenna as a transmitter output is disclosed. The antenna transmission line and a pair of quarter wave lines are connected to a common junction with the antenna transmission line to form a T junction. Other quarter wave transmission lines are connected to each end of the arms of the T junction. Switching diodes at the ends of these other quarter wave transmission lines and a switching diode connected at the junction of one of the quarter wave transmission lines and the arm of the T-junction are rendered conductive to reflect high impedances which protect the receiver and are rendered nonconductive to reflect low impedances which connect the antenna to the receiver and isolate the transmitter output from the antenna to preclude adverse loading of the antenna by the transmitter output during receiving operations.

The present invention relates to a duplexing system for switching a single antenna between a transmitter and a receiver.

Duplexing systems as well known essentially perform the function of a switch, which permits a single aerial or antenna to be used for both transmitting and receiving. The selection of an appropriate duplexing system will be controlled by a number of considerations, such as for example, protection of the receiver input circuits, a requirement that a maximum power be transmitted from the antenna to the receiver, and a requirement that maximum possible efficient use of the transmitter be effected during transmission.

Objections have been raised to existing duplexing systems on the grounds that they are complex, expensive, and do not meet the above set forth requirements.

Accordingly, it is an object of the present invention to provide a new and improved duplexing system.

It is a still further object of the present invention to provide a duplexing system which is easy to operate, simple to construct, relatively inexpensive, and small in size and weight. Accordingly, such a system would be advantageous in airborne equipment, such as for instance, Tacan type systems.

Another object of this invention is to provide an improved duplexing system which is well suited for use in the load circuit of an ultra-high frequency amplifier.

An embodiment of the present invention which accomplishes the above objects and other objects includes at least one electronic switch connected at a selected position to a network which couples an antenna to both a power amplifier and a receiver. More particularly, the electronic switch establishes high impedance and low impedance operating conditions. The low impedance operating condition is present when the power amplifier is to provide an output to the antenna and the high empedance condition being present when the power amplifier is isolated from the antenna and a signal transmitting path is provided from the antenna to the receiver. The switch is located in the network so as to prevent high power from the amplifier from reaching the receiver input.

By virtue of this arrangement, the electronic switch will be in its low impedance condition during operation of the power amplifier and hence, will have a longer operating life than heretofore arrangements, because it will only be subject to high transmitting voltages when in its low impedance condition.

The invention itself, both as to its organization and method of operation, as well as additional objects and advantages thereof will become more readily apparent from a reading of the accompanying description in conjunction with the accompanying drawing which is a schematic illustration of an exemplary circuit embodying the invention.

The drawing depicts a representative circuit including an ultra-high frequency power amplifier 10. The power amplifier 10 includes a grounded grid triode 11 having a control grid 12 which may be electronically and mechanically connected to a casing or control shield; thus tying the grid down to ground potential. An advantage of a ground grid triode is its low input-output capacitance.

Excitation or input signals for the amplifier 10 are supplied by a coaxial cable 13 connected at a junction between cathode 14 of the tube and an inductance coil 15, the coil 15 being grounded. A source of DC operating voltage 18, indicated as $B^+$, is connected to the plate 17 of the tube 11 by way of a coaxial cable 21 and a pulse shaping network 22. The network 22 includes an RF bypass capacitor 23 which is connected to ground so as to pass RF signals to ground. The $B^+$ in this instance is in the form of pulses and is adapted to effectively turn on and off the power amplifier 10. The RF input signal to the amplifier 10 may be either a wide band pulse signal or a continuous wave signal having a frequency within a predetermined band or range which may be, for example, the L band.

The power amplifier 10 is coupled to a load circuit including an antenna 24 and a series of coaxial cable transmission lines 25–28 which are joined to the coaxial line 21.

The coaxial cable 28 is adapted to couple the antenna 24 to a T-junction 30 and is choosen so that its characteristic impedance is substantially matched to that of the input impedance of the antenna 24. Leading from the T-junction 30 to the cable 21 are the cables 25 and 26 which are serially connected. The cable 26 is sized to be one quarter of a wavelength, whereas the cable 25 is sized to be any convenient length. The T-junction 30 also leads to the receiver 31 and this connection is accomplished by means of coaxial cables 32 and 33, with the coaxial cable 32 being sized to be one quarter of a wavelength, while the coaxial cable 33 is sized to be one quarter of a wavelength.

Although the coaxial cables are noted as having a specific wavelength, it will be appreciated that this wavelength is measured at an intermediate frequency in the frequency range of operation, considering the capacitance of the diodes to be described hereinafter. The quarter wavelength section of the coaxial cable, for example, will have characteristics effectively approximating a quarter wavelength line over the entire frequency range of operation. Furthermore, where coaxial cables are indicated as being one quarter wavelength long, cables of an odd multiple quarter wavelength will also be effective. Still further, although coaxial cables have been illustrated, it should be understood that other varieties of transmission lines may also be used, such as for example, wave guides.

Three electronic switches 35, 36, and 37 in combination with the above-described networks define the duplexing system which effectively switches the power conducting path from the antenna 24 to either the power amplifier 10 or the receiver 31.

In accordance with the present invention, electronic switches 35, 36, and 37 shown to be PIN diodes, are disposed along the length of the transmission networks at discrete junction points; namely, junction points 40, 41, and 42, with the junction 40 being between the cables 32 and 33, the junction 41 being disposed between the receiver 31 and the cable 33, and the junction 42 being arranged to be connected to the end position of the cable 27. PIN diodes type MS–6010 may, for an example, be suitably used in this invention.

Switching means are also provided which include a control circuit 45 having a lead 46 which is connected to each of the electronic switches 35–37 and is arranged to selectively adjust the electronic switches between high and low impedance conditions. It should be noted that RF bypass capacitors 50 are arranged between ground and the connection of the lead 46 to the diodes 35–37. Positive potential may be applied by the lead 46 to forward bias the electronic switches positioning them in a low impedance mode, whereas when this forward bias is removed, the electronic switches 35–37 will again be returned to a non-conductive state where they present a high impedance.

PIN diodes or p-i-n diodes, as they are sometimes referred to, are switching diodes comprising $P^+$ type and $N^+$ regions connected by an intrinsic layer. The resistance of the PIN diodes may be controlled by a DC bias; that is, the PIN diode may be back biased to provide a very high impedance in the order of 10,000 ohms or better, and may be forward biased so that its resistance is effectively in the range of from about 1 to 2 ohms. PIN diodes are particularly advantageous over ordinary diodes in rapid switching applications since they provide low capacitance, high breakdown voltage, a low series resistance, and are small in size. It should be recognized, however, that other types of switching means, such as for example, transistors which have electronic characteristics similar to PIN diodes may be employed in the practice of this invention.

In operation during transmission, the diodes 35–37 are biased to their low impedance value so that the resistance of the diode 35 is reflected to be at a very high level when viewed from the T-junction 30. This in effect isolates the transmitter path from the receiver and directs all of the power from the transmitter to exit by way of the antenna 24. To aid in further isolating the receiver 31, the diode 36 is placed at the junction 41. At this same time, the low impedance of the PIN diode 37 is transformed to a high impedance at junction 43 by the one quarter wavelength line 27.

When the receiver 41 is to function, the diodes 35–37 are biased to the high impedance condition and a conductive path is established between the antenna 24 and the receiver 31 in a manner exactly reversed to that previously described. At this time, the high impedance of PIN diode 37 is transformed to a low impedance at junction 43 by the one quarter wavelength line 27. The impedance which line 25 presents to junction 43 has little effect because it is in parallel with the low impedance presented by line 27 and diode 37. The low impedance of junction 43 is transformed to a high impedance at junction 30 by line 26 which is one quarter wavelength long.

While a specific embodiment of the invention has been described and shown, it should be considered only to be illustrative. Still further modifications will undoubtably occur to those skilled in the art. For example, the amplifier 10 of the present invention is not confined for use with grounded grid triode vacuum tubes, nor is the invention limited to only an ultra-high frequency range of operation. Therefore, the foregoing description is to be considered as illustrative and not in any limiting sense.

What is claimed is:

1. A wideband duplexer for switching the power transferring path from an antenna between a transmitter output and a receiver input, respectively for transmit and receive operation, and also for isolating the transmitter output from the antenna during receive operation, said duplexer comprising (a) an antenna transmission line coupled to said antenna, (b) a first transmission network connected to said antenna transmission line and coupling said antenna to said transmitter output, (c) a second transmission network which couples said antenna to said receiver, (d) an electronic switch connected at a discrete position to said second network and having a high impedance operating condition and a low impedance operating condition, (e) electronic switching means for selectively moving said electronic switch between its high and low operating conditions, the joinder position of said electronic switch with said second network being disposed so that when in its low impedance condition said switch effectively isolates said receiver from said antenna and a power transferring path is provided between said transmitter and said antenna, and when said switch is in its high impedance condition it permits a power transferring path from said antenna to said receiver, and (f) another electronic switch, a one quarter wavelength transmission device coupling said another switch to said first network, said first network including a one quarter wavelength line section being disposed between the joinder positions of said transmission device and said antenna transmission line with said first network, said another electronic switch having high and low impedance conditions and adapted to be actuated by said electronic switching means to be in its high impedance condition for isolating said transmitter output from said receiver input during power transmission from said antenna to said receiver for receive operation over said band.

References Cited

UNITED STATES PATENTS 2,959,778 11/1960 Bradley ............ 325—24

ROBERT L. GRIFFIN, Primary Examiner

ALBERT J. MAYER, Assistant Examiner

U.S. Cl. X.R.

325—23